United States Patent
Junqua et al.

(10) Patent No.: US 6,324,512 B1
(45) Date of Patent: Nov. 27, 2001

(54) SYSTEM AND METHOD FOR ALLOWING FAMILY MEMBERS TO ACCESS TV CONTENTS AND PROGRAM MEDIA RECORDER OVER TELEPHONE OR INTERNET

(75) Inventors: Jean-Claude Junqua; Roland Kuhn; Tony Davis, all of Santa Barbara; Yi Zhao, Goleta, all of CA (US); Weiying Li, Monteal (CA)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/383,760

(22) Filed: Aug. 26, 1999

(51) Int. Cl.[7] ............... G10L 15/14; G10L 15/10; G10L 15/18; G10L 21/00; G10L 21/06
(52) U.S. Cl. ............... 704/275; 704/231; 704/246; 704/273; 704/251; 704/257; 704/256
(58) Field of Search ................... 704/270, 275, 704/246, 250, 253, 256, 257, 273

(56) References Cited

U.S. PATENT DOCUMENTS

| | | |
|---|---|---|
| 5,774,859 | 6/1998 | Houser et al. . |
| 5,819,220 * | 10/1998 | Sarukkai et al. ............ 704/270 |
| 5,832,439 * | 11/1998 | Cox, Jr. et al. ............. 704/275 |
| 5,890,123 * | 3/1999 | Brown et al. ............... 704/275 |
| 6,133,909 * | 10/2000 | Schein et al. ............... 345/327 |
| 6,177,931 * | 1/2001 | Alexander et al. .......... 345/721 |

OTHER PUBLICATIONS

VoiceAssist ("VoiceAssist User's Guide," Creative Labs, ©1997).*

"Will ReplayTV make me more popular?, And Other Frequently Asked Questions"; promotional material, www.replaytv.com/replaytv/faq.htm#q7; Aug. 24, 1999, pp. 1–3.

* cited by examiner

Primary Examiner—Richemond Dorvil
Assistant Examiner—Daniel A. Nolan
(74) Attorney, Agent, or Firm—Harness, Dickey & Pierce, P.L.C.

(57) ABSTRACT

Users of the system can access the TV contents and program media recorder by speaking in natural language sentences. The user interacts with the television and with other multimedia equipment, such as media recorders and VCRs, through the unified access controller. A speaker verification/identification module determines the identity of the speaker and this information is used to control how the dialog between user and system proceeds. Speech can be input through either a microphone or over the telephone. In addition, the user can interact with the system using a suitable computer attached via the internet. Regardless of the mode of access, the unified access controller interprets the semantic content of the user's request and supplies the appropriate control signals to the television tuner and/or recorder.

13 Claims, 5 Drawing Sheets

SYSTEM AND METHOD FOR ALLOWING FAMILY MEMBERS TO ACCESS TV CONTENTS AND PROGRAM MEDIA RECORDER OVER TELEPHONE OR INTERNET

BACKGROUND AND SUMMARY OF THE INVENTION

The present invention relates generally to multimedia consumer products such as interactive televisions and programmable media recorders. More particularly, the invention relates to a unified access system to allow these multimedia products to be controlled over the telephone or over the Internet.

Interactive television and associated multimedia technology, such as "replay" TV promises to change the way consumers use their home entertainment systems. Much is promised in the way of increased program content, video on demand, Internet web searching and e-mail via the television, and the like. However, interacting with this new, greatly enhanced home entertainment and information medium presents a set of challenging problems. Many are beginning to recognize that the on-screen electronic program guide and the ubiquitous pushbutton remote control device fall far short as a means to control this new medium.

Speech-enabled control appears promising, because it would allow users to interact with their home entertainment and information system by spoken commands. Entering spoken commands into the TV set is just the beginning. To provide a natural and intuitive user interface, the system should allow users to speak in natural language, just as they would speak to another person. Moreover, while spoken interaction with the television set may be good for some types of interaction, there are other situations where a different modality could be more useful.

For example, when the user is interacting with the television so that he or she is able to see on-screen prompts and is able to see the program material being broadcast, spoken interaction can be readily mixed with conventional pushbutton interaction. However, this interface falls apart when the user is attempting to interact with the television set over the telephone or remotely over the Internet, where the user does not see the television screen.

The present invention provides a system that will allow the user to interact with the television and with other associated multimedia equipment, including VCRs and other media recorders, through a unified access, speech-enabled system.

The system provides speaker verification/identification, so that the identity of the speaker can be determined by simply "recognizing" the speaker's voice. Based on the speaker's identity, the system loads the appropriate set of user profile parameters that will guide interaction between that user and the system.

The system automatically determines what modality the user has currently invoked (direct voice contact, telephone voice contact, Internet commands) and employs a natural language grammar that is appropriate for the current modality. In this way, the system automatically selects the most natural form of dialog with which to learn and carry out the user's instructions.

For example, when the modality is by direct voice contact with the television (e.g., in the television viewing room) on-screen displays may be provided to assist the user in making program selections. Conversely, if the telephone modality has been selected, on-screen prompts are dispensed with, and the system instead synthesizes speech responses that are sent to the user through the telephone connection. Furthermore, when the Internet modality has been selected, the system allows the user to interact more directly with the data stored in slots by the natural language parser. In this way, the user can view the current state of the system and enter changes by keyboard entry.

For a more complete understanding of the invention, its objects and advantages, refer to the following specification and to the accompanying drawings.

DESCRIPTION OF THE PREFERRED EMBODIMENT

Figure 1:
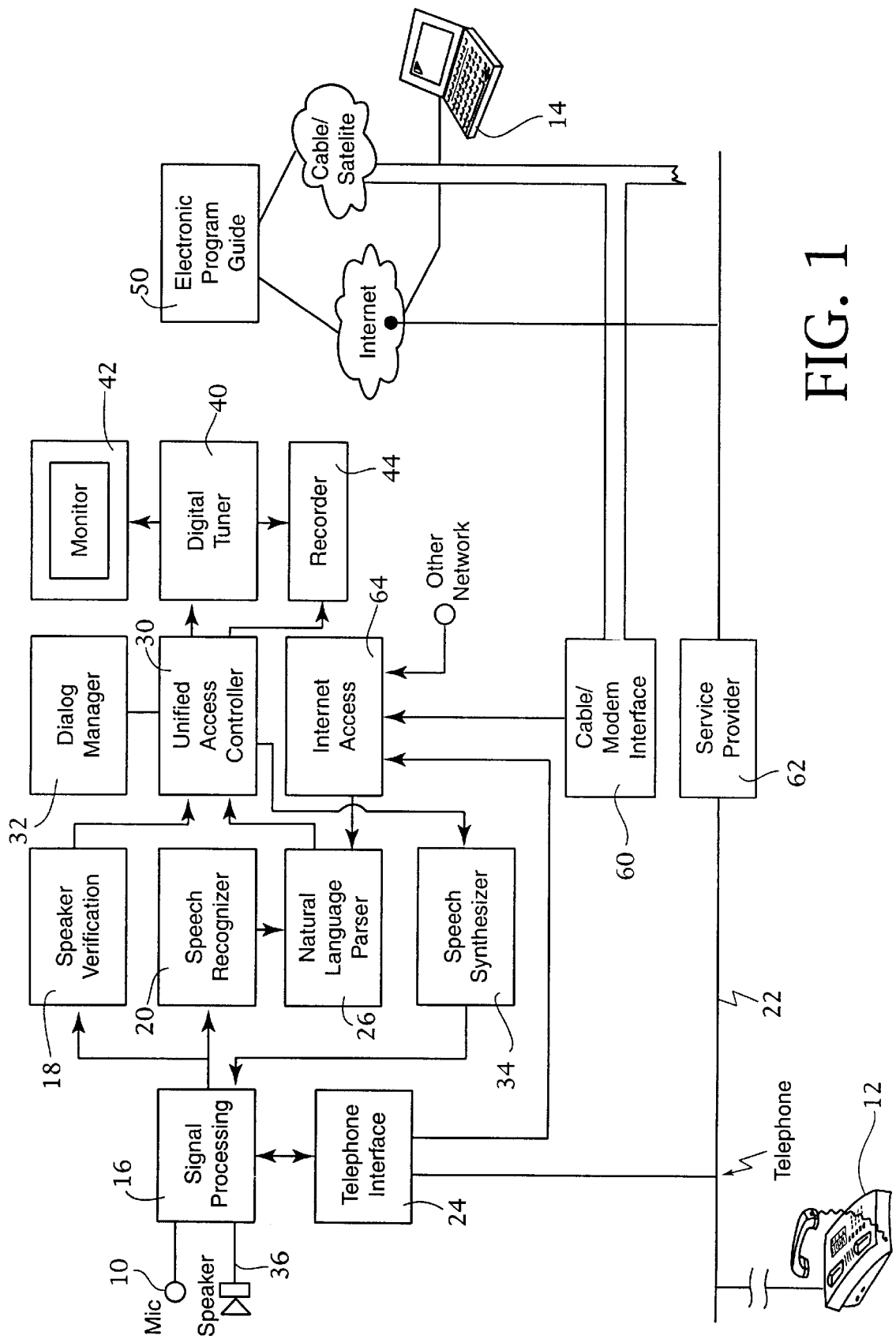
FIG. 1 is a block diagram of a preferred embodiment of the invention.

Referring to FIG. 1, the unified access system includes multiple input points by which the user can interact with the system via the supplied microphone input port 10, via any telephone, such as telephone 12 and even via the Internet using a suitable computer such as laptop computer 14. Input from the microphone is supplied to a signal processing module 16. This module optionally filters and digitizes the user's input speech so that it may be supplied to the speaker verification/identification module 18 and speech recognizer module 20.

User input through a telephone 12 is supplied through the existing telephone infrastructure 22 to a telephone interface 24 within the system. The telephone interface answers the user's incoming call and passes the user's voiced instructions to the signal processing module 16.

The system is designed to hold a natural language dialog with users. The dialog can be modified to suit each individual user. Speaker verification/identification module 18 determines the identity of the user by examining the characteristics of the user's voice. The presently preferred speaker verification/identification module uses an eigenvoice speaker verification/identification system that will be described more fully below.

The user's spoken instructions are converted into text by speech recognizer 20, and the output of speech recognizer 20 is supplied to a natural language parser 26. The natural language parser is preferably a goal-oriented parser that has a pre-defined database of goal-oriented grammars stored within it. Speech is converted by recognizer 20 into words, phrases and sentences which are in turn analyzed by the parser to extract the user's meaning from the sentences. More details of the presently preferred parser will be described more fully below.

The parser supplies its output to a unified access controller module 30. The controller module has an associated dialog manager 32. The unified access controller is also coupled to the speaker verification module 18, so that the unified access controller is made known of the identity of the speaker.

Using its dialog manager 32, the unified access controller prompts the user for additional information, if required, by sending text queries to the speech synthesizer module 34. Synthesizer module 34 converts these text queries into synthesized speech, which is then supplied to the signal processing module 16 for replay through speaker 36 or via the telephone interface 24 through the user's telephone handset (e.g., telephone 12).

If the user's instruction is sufficiently refined to constitute a command, the unified access controller sends a control command to the digital tuner 40. Tuner 40 selects the appropriate television channel so that the user's requested program will be displayed on television monitor 42. The unified access controller is also optionally coupled to a recording device, such as recorder 44. The user may thus send commands to cause a recording to be made of a selected broadcast.

The natural language parser and dialog manager allow a complex interaction between the user and his or her audio video equipment. The parser will understand complex sentences such as "Are there any movies on tonight produced by Woody Allen?" The unified access controller would respond to such a question by obtaining a current copy of the electronic program guide 50 via Internet or through the cable or satellite infrastructure. If the requested program is found, the dialog manager formulates a response, advising the user that the program is, or is not, available for viewing on the requested day. The unified access controller then sends a text message to the speech synthesizer 34, which, in turn, synthesizes a spoken reply.

If, after having heard the reply, the user wishes to view or record the program, the user simply speaks into the system and the speech recognizer, natural language parser and unified access controller carry out the user's wishes.

While speech input is often easiest for most users, the unified access control system also allows the user to interact with the system by suitable Internet connection. The system can be connected to the Internet through a variety of ways, including a cable modem interface 60, and a telephone connection interface via a suitable service provider 62. The system includes an Internet access module 64 that has suitable TCP/IP protocols built-in for effecting Internet access. The cable modem 60 may be coupled to the Internet access module 64, as illustrated. If Internet access is provided through a service provider 62, the Internet access module 64 may be coupled to the telephone interface 24, as illustrated.

The following sections will describe in further detail the natural language parser and its associated dialog manager, the speaker verification/identification module 18, and the manner by which the electronic program guide 50 is incorporated into the natural language parser's search structure.

Figure 2:
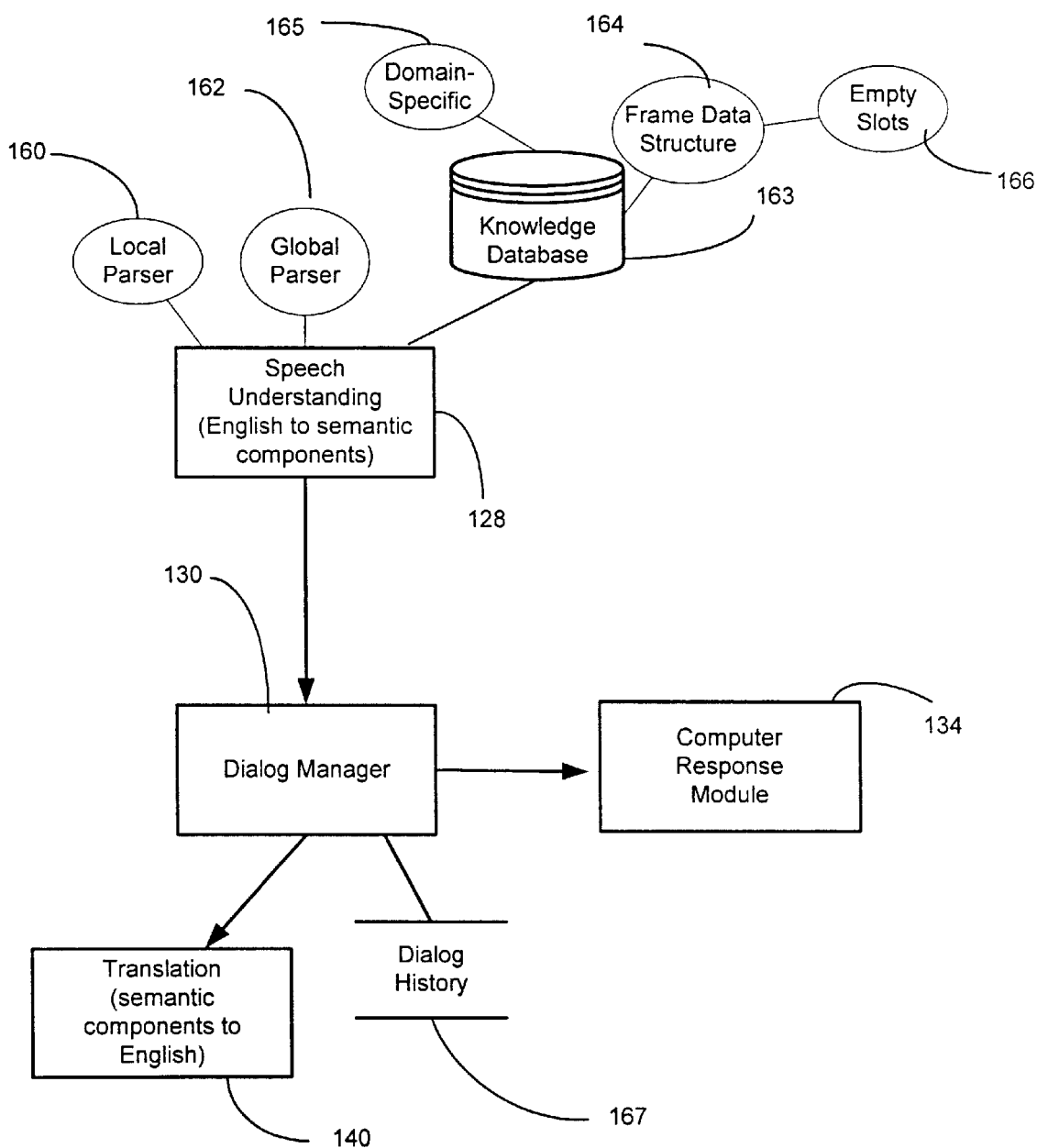
FIG. 2 is a block diagram depicting the components of the natural language parser of the presently preferred embodiment of the invention.

FIG. 2 depicts components of the natural language parser 26 in more detail. In particular, speech understanding module 128 includes a local parser 160 to identify predetermined relevant task-related fragments. Speech understanding module 128 also includes a global parser 162 to extract the overall semantics of the speaker's request.

The local parser 160 utilizes in the preferred embodiment small and multiple grammars along with several passes and a unique scoring mechanism to provide parse hypotheses. For example, the novel local parser 102 recognizes according to this approach phrases such as dates, names of people, and movie categories. If a speaker utters "record me a comedy in which Mel Brooks stars and is shown before January 23rd", the local parser recognizes: "comedy" as being a movie category; "January 23rd" as a date; and "Mel Brooks" as an actor. The global parser assembles those items (movie category, date, etc.) together and recognizes that the speaker wishes to record a movie with certain constraints.

Speech understanding module 128 includes knowledge database 163 which encodes the semantics of a domain (i.e., goal to be achieved). In this sense, knowledge database 163 is preferably a domain-specific database as depicted by reference numeral 165 and is used by dialog manager 130 to determine whether a particular action related to achieving a predetermined goal is possible.

The preferred embodiment encodes the semantics via a frame data structure 164. The frame data structure 164 contains empty slots 166 which are filled when the semantic interpretation of global parser 162 matches the frame. For example, a frame data structure (whose domain is tuner commands) includes an empty slot for specifying the viewer-requested channel for a time period. If a viewer has provided the channel, then that empty slot is filled with that information. However, if that particular frame needs to be filled after the viewer has initially provided its request, then dialog manager 130 instructs computer response module 134 to ask the viewer to provide a desired channel.

The frame data structure 164 preferably includes multiple frames which each in turn have multiple slots. One frame may have slots directed to attributes of a movie, director, type of movie. Another frame may have slots directed to attributes associated with the time in which the movie is playing, the channel, and so forth.

The following reference discusses global parsers and frames: R. Kuhn and R. D. Mori, *Spoken Dialogues with Computers* (Chapter 14: Sentence Interpretation), Academic Press, Boston (1998).

Dialog manager 130 uses dialog history data file 167 to assist in filling in empty slots before asking the speaker for the information. Dialog history data file 167 contains a log of the conversation which has occurred through the device of the present invention. For example, if a speaker utters "I'd like to watch another Marilyn Monroe movie," the dialog manager 130 examines the dialog history data file 167 to check what movies the user has already viewed or rejected in a previous dialog exchange. If the speaker had previously rejected "Some Like It Hot", then the dialog manager 130 fills the empty slot of the movie title with movies of a different title. If a sufficient number of slots have been filled, then the present invention will ask the speaker to verify and confirm the program selection. Thus, if any assumptions made by the dialog manager 130 through the use of dialog history data file 167 prove to be incorrect, then the speaker can correct the assumption.

The natural language parser 26 analyzes and extracts semantically important and meaningful topics from a loosely structured, natural language text which may have been generated as the output of an automatic speech recognition system (ASR) used by a dialogue or speech understanding system. The natural language parser 26 translates the natural language text input 140 to a new representation by generating well-structured tags containing topic information and data, and associating each tag with the segments of the input text containing the tagged information. In addition, tags may be generated in other forms such as a separate list, or as a semantic frame. Robustness is a feature of the natural language parser 26 as the input an contain grammatically incorrect English sentences, due to the following reasons: the input to the recognizer is casual, dialog style, natural speech can contain broken sentences, partial phrases, and the insertion, omission, or misrecognition of errors by the speech recognizer even when the speech input is considered correct. The natural language parser 26 deals robustly with all types of input and extracts as much information as possible.

Figure 3:
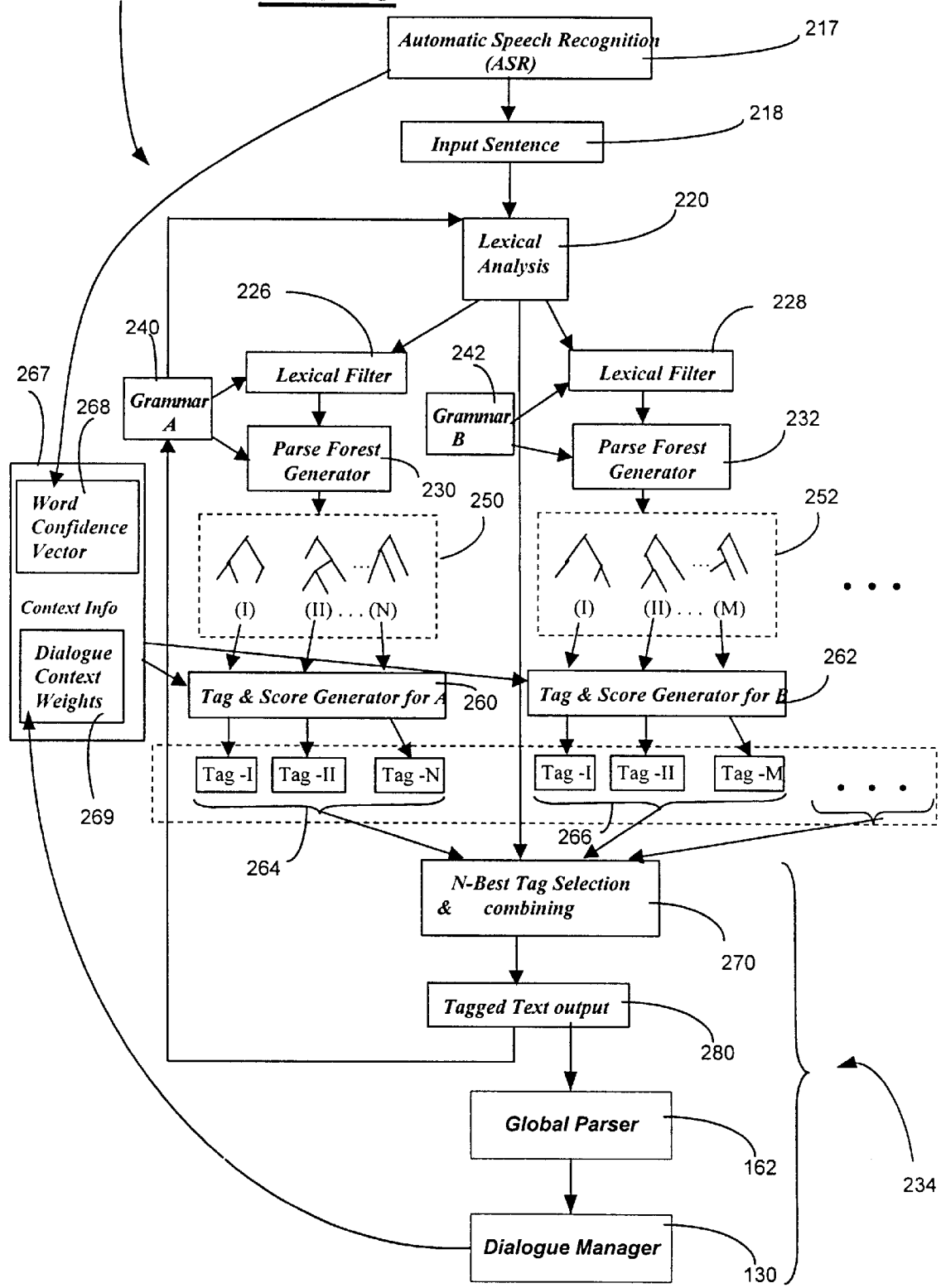
FIG. 3 is a block diagram depicting the components of the local parser of the presently preferred embodiment of the invention.

FIG. 3 depicts the different components of the local parser 160 of the natural language parser 24. The natural language parser 26 preferably utilizes generalized parsing techniques in a multi-pass approach as a fixed-point computation. Each topic is described as a context-sensitive LR (left-right and rightmost derivation) grammar, allowing ambiguities. The following are references related to context-sensitive LR grammars: A. Aho and J. D. Ullman, *Principles of Compiler Design,* Addison Wesley Publishing Co., Reading, Mass. (1977); and N. Tomita, *Generalized LR Parsing,* Kluwer Academic Publishers, Boston, Mass. (1991).

At each pass of the computation, a generalized parsing algorithm is used to generate preferably all possible (both complete and partial) parse trees independently for each targeted topic. Each pass potentially generates several alternative parse-trees, each parse-tree representing a possibly different interpretation of a particular topic. The multiple passes through preferably parallel and independent paths result in a substantial elimination of ambiguities and overlap among different topics. The generalized parsing algorithm is a systematic way of scoring all possible parse-trees so that the (N) best candidates are selected utilizing the contextual information present in the system.

Local parsing system 160 is carried out in three stages: lexical analysis 220; parallel parse-forest generation for each topic (for example, generators 230 and 232); and analysis and synthesis of parsed components as shown generally by reference numeral 234.

Lexical Analysis

A speaker utters a phrase that is recognized by an automatic speech recognizer 217 which generates input sentence 218. Lexical analysis stage 220 identifies and generates tags for the topics (which do not require extensive grammars) in input sentence 218 using lexical filters 226 and 228. These include, for example, movie names; category of movie; producers; names of actors and actresses; and the like. A regular-expression scan of the input sentence 218 using the keywords involved in the mentioned exemplary tags is typically sufficient at this level. Also, performed at this stage is the tagging of words in the input sentence that are not part of the lexicon of particular grammar. These words are indicated using an X-tag so that such noise words are replaced with the letter "X".

Parallel Parse-forest Generation

The parser 26 uses a high-level general parsing strategy to describe and parse each topic separately, and generates tags and maps them to the input stream. Due to the nature of unstructured input text 218, each individual topic parser preferably accepts as large a language as possible, ignoring all but important words, dealing with insertion and deletion errors. The parsing of each topic involves designing context-sensitive grammar rules using a meta-level specification language, much like the ones used in LR parsing. Examples of grammars include grammar A 240 and grammar B 242. Using the present invention's approach, topic grammars 240 and 242 are described as if they were an LR-type grammar, containing redundancies and without eliminating shift and reduce conflicts. The result of parsing an input sentence is all possible parses based on the grammar specifications.

Generators 230 and 232 generate parse forests 250 and 252 for their topics. Tag-generation is done by synthesizing actual information found in the parse tree obtained during parsing. Tag generation is accomplished via tag and score generators 260 and 262 which respectively generate tags 264 and 266. Each identified tag also carries information about what set of input words in the input sentence are covered by the tag. Subsequently the tag replaces its cover-set. In the preferred embodiment, context information 267 is utilized for tag and score generations, such as by generators 260 and 262. Context information 267 is utilized in the scoring heuristics for adjusting weights associated with a heuristic scoring factor technique that is discussed below. Context information 267 preferably includes word confidence vector 268 and dialogue context weights 269. However, it should be understood that the parser 26 is not limited to using both word confidence vector 268 and dialogue context weights 269, but also includes using one to the exclusion of the other, as well as not utilizing context information 267.

Automatic speech recognition process block 217 generates word confidence vector 268 which indicates how well the words in input sentence 218 were recognized. Dialog manager 130 generates dialogue context weights 269 by determining the state of the dialogue. For example, dialog manager 130 asks a user about a particular topic, such as, what viewing time is preferable. Due to this request, dialog manager 130 determines that the state of the dialogue is time-oriented.

Dialog manager 130 provides dialogue context weights 269 in order to inform the proper processes to more heavily weight the detected time-oriented words.

Synthesis of Tag-components

The topic spotting parser of the previous stage generates a significant amount of information that needs to be analyzed and combined together to form the final output of the local parser. The parser 26 is preferably as "aggressive" as possible in spotting each topic resulting in the generation of multiple tag candidates. Additionally in the presence of numbers or certain key-words, such as "between", "before", "and", "or", "around", etc., and especially if these words have been introduced or dropped due to recognition errors it is possible to construct many alternative tag candidates. For example, an input sentence could have insertion or deletion errors. The combining phase determines which tags form a more meaningful interpretation of the input. The parser 26 defines heuristics and makes a selection based on them using a N-Best candidate selection process. Each generated tag corresponds to a set of words in the input word string, called the tag's cover-set.

A heuristic is used that takes into account the cover-sets of the tags used to generate a score. The score roughly depends on the size of the cover-set, the sizes in the number of the words of the gaps within the covered items, and the weights assigned to the presence of certain keywords. In the preferred embodiment, ASR-derived confidence vector and dialog context information are utilized to assign priorities to the tags. For example applying channel-tags parsing first potentially removes channel-related numbers that are easier to identify uniquely from the input stream, and leaves fewer numbers to create ambiguities with other tags. Preferably, dialog context information is used to adjust the priorities.

N-Best Candidates Selection

At the end of each pass, an N-best processor 270 selects the N-best candidates based upon the scores associated with the tags and generates the topic-tags, each representing the information found in the corresponding parse-tree. Once topics have been discovered this way, the corresponding words in the input can be substituted with the tag information. This substitution transformation eliminates the corresponding words from the current input text. The output 280 of each pass is fed-back to the next pass as the new input, since the substitutions may help in the elimination of certain ambiguities among competing grammars or help generate better parse-trees by filtering out overlapping symbols.

Computation ceases when no additional tags are generated in the last pass. The output of the final pass becomes the output of the local parser to global parser 162. Since each phase can only reduce the number of words in its input and the length of the input text is finite, the number of passes in the fixed-point computation is linearly bounded by the size of its input.

The following scoring factors are used to rank the alternative parse trees based on the following attributes of a parse-tree:

Number of terminal symbols.

Number of non-terminal symbols.

The depth of the parse-tree.

The size of the gaps in the terminal symbols.

ASR-Confidence measures associated with each terminal symbol.

Context-adjustable weights associated with each terminal and non-terminal symbol.

Each path preferably corresponds to a separate topic that can be developed independently, operating on a small amount of data, in a computationally inexpensive way. The architecture of the parser 26 is flexible and modular so incorporating additional paths and grammars, for new topics, or changing heuristics for particular topics is straight forward, this also allows developing reusable components that can be shared among different systems easily.

The typical electronic program guide 50 represents a complex hierarchical structure that breaks down different types of program content according to type. Thus a program 50 may divide programs into different categories, such as movies, sports, news, weather, and the like. These categories may further be subdivided. Thus movies may be subdivided into categories such as comedies, drama, science fiction and so forth. A semantic representation of the electronic program guide contents is stored based on the same goal-oriented grammar structure used by the natural language parser. This allows the parser 42 to readily find information about what is available for viewing. If the user has asked for comedy movies, the comedy movie portion of the semantic representation is accessed by the parser 42, and the available programs falling under this category may then be displayed to the user.

Speaker Verification/Identification

The speaker verification/identification module 18 is preferably based on a speaker representation technique that we call eigenvoices. A plurality of training speakers are provided and these speakers are used to construct an eigenspace that is then used in the speaker verification/identification module.

Figure 4:
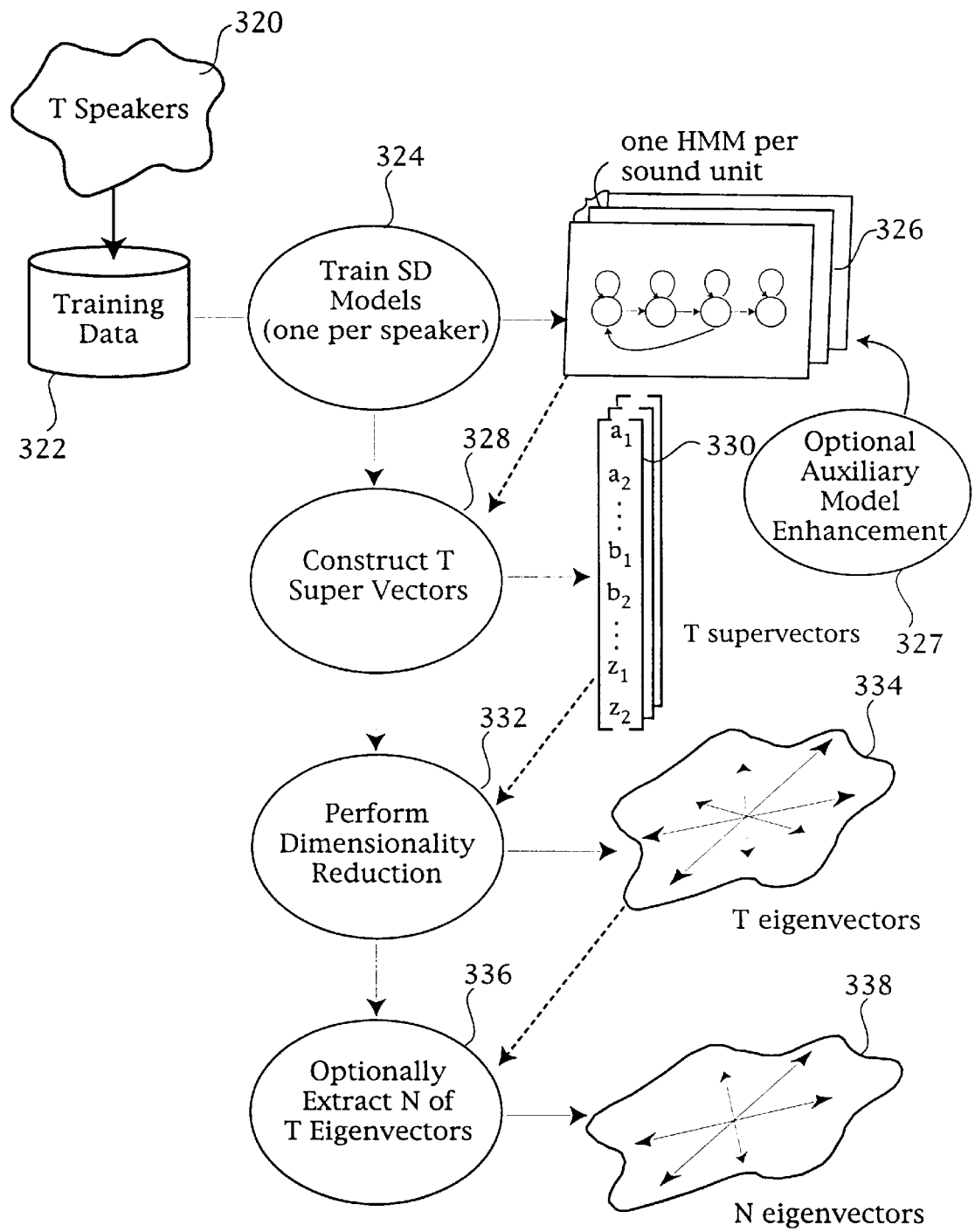
FIG. 4 is a data flow diagram illustrating how to construct an eigenspace from a plurality of training speakers.

The process for constructing an eigenspace to represent a plurality of training speakers is illustrated in FIG. 4. The illustration assumes a number T of training speakers 320 provide a corpus of training data 322 upon which the eigenspace will be constructed. Preferably, a reasonably large number of speakers (on the order of 100 to 200) provide the training data. These training data are then used to train a speaker dependent (SD) model as illustrated at 324. One model per speaker is constructed at step 324, with each model representing the entire inventory of sound units that is to be understood by the recognition system. Each model can be a set of Hidden Markov Models (HMM) or other parameter-based speech modeling system. In the present embodiment, one HMM for each sound unit is employed. This is illustrated in FIG. 4 at 326.

Superior results are achieved where the training set represents accurate speaker-dependent models. Therefore, if desired, the speaker-dependent models may be enhanced using auxiliary adaptation techniques. Such techniques include Maximum A Posteriori estimation (MAP) and other transformation-based approaches, such as Maximum Likelihood Linear Regression (MLLR). This optional auxiliary adaptation processing is illustrated in FIG. 4 at 327 Enhancing the speaker-dependent models in this way is particularly advantageous when constructing large vocabulary applications, where the amount of training data per parameter for a given speaker may be low.

After all training data from T speakers have been used to train the respective speaker dependent models, a set of T supervectors is constructed at 328. Thus there will be one supervector 330 for each of the T speakers. The supervector for each speaker comprises an ordered list of parameters (typically floating point numbers) corresponding to at least a portion of the parameters 318 of the Hidden Markov Models for that speaker. Parameters corresponding to the sound units are included in the supervector for a given speaker. The parameters may be organized in any convenient order. The order is not critical; however, once an order is adopted it must be followed for all T speakers.

The ordered Hidden Markov Model parameters are then concatenated to form the supervector. The choice of which HMM parameters to include in the supervector may depend on the available processing power. We have found that constructing supervectors from the Gaussian means gives good results. If greater processing power is available, the supervectors may also include other HMM parameters, such as the transition probabilities or the Covariance matrix parameters. Naturally, if the Hidden Markov Models generate discrete outputs (as opposed to probability densities) then these output values may be used to comprise the supervector.

After supervectors have been constructed for each of the training speakers, dimensionality reduction is performed at step 332. Dimensionality reduction is effected by mapping of high-dimensional space onto low-dimensional space. A variety of different techniques may be used to effect dimensionality reduction. These include Principal Component Analysis (PCA), Linear Discriminant Analysis (LDA), Factor Analysis (FA), Independent Component Analysis (ICA), Singular Value Decomposition (SVD) and other transformations that apply reduction criteria based on variance.

The invention may be implemented with any such method (not only those listed) for finding such a constant linear transformation M in the special case where the input vectors are training supervectors derived from speaker-dependent modeling, and where M is used to carry out the aforementioned technique.

Dimensionality reduction upon T supervectors yields T eigenvectors, as at 334. Thus, if 320 training speakers have been used the system will generate 320 eigenvectors. These eigenvectors define what we call eigenvoice space or eigenspace.

The eigenvectors that make up the eigenvoice space contain different information; they each represent a different dimension across which different speakers may be differentiated. Each supervector in the original training set can be represented as a linear combination of these eigenvectors. The eigenvectors are ordered by their importance in modeling the data: the first eigenvector is more important than the second, which is more important than the third, and so on. Our experiments with this technique thus far show that the first eigenvector appears to correspond to a male-female dimension.

Although a maximum of T eigenvectors is produced at step 332, in practice, it is possible to discard several of these eigenvectors, keeping only the first N eigenvectors. Thus at step 336 we optionally extract N of the T eigenvectors to comprise a reduced parameter eigenspace at 338. The higher order eigenvectors can be discarded because they typically contain less important information with which to discriminate among speakers. Reducing the eigenvoice space to fewer than the total number of training speakers provides an inherent data compression that can be helpful when constructing practical systems with limited memory and processor resources.

After generating the eigenvectors from the training data each speaker in the training data is represented in eigenspace. In the case of speaker identification, each known client speaker is represented in eigenspace; in the case of speaker verification, the client speaker and potential impostor speakers are represented in eigenspace. The speakers may be represented in eigenspace either as points in eigenspace or as probability distributions in eigenspace.

Figure 5:
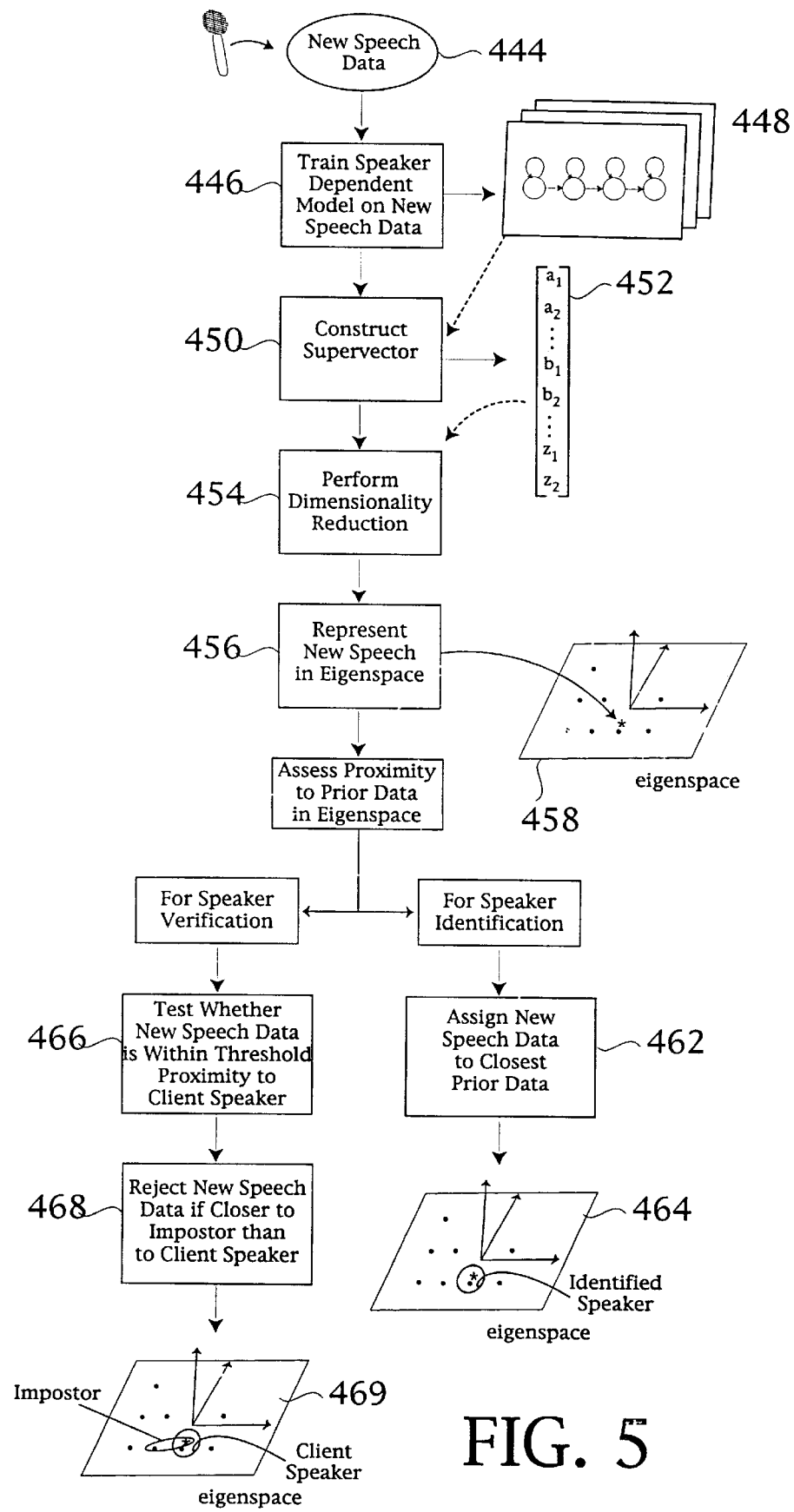
FIG. 5 illustrates the speaker verification/identification process of the preferred embodiment.

Referring to FIG. 5, the user seeking speaker identification or verification supplies new speech data at 444 and these data are used to train a speaker dependent model as indicated at step 446. The model 448 is then used at step 450 to construct a supervector 452. Note that the new speech data may not necessarily include an example of each sound unit. For instance, the new speech utterance may be too short to contain examples of all sound units.

Dimensionality reduction is performed at step 454 upon the supervector 452, resulting in a new data point that can be represented in eigenspace as indicated at step 456 and illustrated at 458. In the illustration at 458 the previously acquired points in eigenspace (based on training speakers) are represented as dots, whereas the new speech data point is represented by a star.

Having placed the new data point in eigenspace, it may now be assessed with respect to its proximity to the other prior data points or data distributions corresponding to the training speakers. FIG. 5 illustrates an exemplary embodiment of both speaker identification and speaker verification.

For speaker identification, the new speech data is assigned to the closest training speaker in eigenspace, step 462 diagrammatically illustrated at 464. The system will thus identify the new speech as being that of the prior training speaker whose data point or data distribution lies closest to the new speech in eigenspace.

For speaker verification, the system tests the new data point at step 466 to determine whether it is within a predetermined threshold proximity to the client speaker in eigenspace. As a safeguard the system may, at step 468, reject the new speaker data if it lies closer in eigenspace to an impostor than to the client speaker. This is diagrammatically illustrated at 469, where the proximity to the client speaker and proximity to the closest impostor have been depicted.

From the foregoing it will be appreciated that the unified access system of the invention gives the user a multimodal way to interact with an electronic program guide either at home, over the phone or over the Internet. By means of speech recognition and natural language technology, which includes a speaker verification feature, a family member can access TV contents using voice. Once the user has been identified as a family member, he or she can perform complex search strategies using natural language. The user can thus tune the television or make recordings even at a distance from home.

While the system has been described in its presently preferred embodiment, it will be understood that the invention is capable of certain modification without departing from the spirit of the invention as set forth in the appended claims.

What is claimed is:

1. A unified access system for controlling audio/video components, comprising:

a unified access controller having port for communicating with at least one audio/video component and for supplying control commands to said component;

a speech recognition system coupled to said unified access controller;

said speech recognition system having a first input for user entry of spoken information by microphone and a second input for user entry of spoken information by telephone;

storage system for acquiring and storing an electronic program guide that identifies program content that is available for presentation through said audio/video component;

natural language parser coupled to said speech recognition system and to said storage system for extracting semantics from said user entry of spoken information and for correlating said extracted semantics with said electronic program guide.

2. The unified access system of claim 1 further comprising a third input for user entry of information through a computer network.

3. The unified access system of claim 2 wherein said third input includes internet access module coupled to said natural language parser for conveying information entered through said computer network to said parser.

4. The unified access system of claim 1 wherein said storage system includes internet access module coupled to a computer network for acquisition of said electronic program guide.

5. The unified access system of claim 1 wherein said unified access controller supplies control commands to a plurality of audio/video components.

6. The unified access system of claim 5 wherein said plurality of components includes a display monitor and a recorder.

7. The unified access system of claim 1 wherein said storage system includes cable interface for acquiring said electronic program guide over a channel that also provides audio/video content.

8. The unified access system of claim 1 further comprising speaker verification module coupled to at least one of said first and second inputs for ascertaining the identity of the user who is speaking.

9. The unified access system of claim 8 further comprising a data store containing user profile data that is accessed based on the identity of the user as determined by said speaker verification module.

10. The unified access system of claim 1 wherein said natural language parser is a goal-oriented parser that extracts semantics using a prestored set of frames having slots corresponding to predefined semantic content.

11. The unified access system of claim 10 wherein said recognition system supplies data to fill said slots based on keyword information extracted from said spoken information.

12. The unified access system of claim 1 further comprising a dialog manager coupled to at least one of said unified access controller and said parser, said dialog manager generating prompts to the user to elicit further spoken information from said user.

13. The unified access system of claim 1 further comprising speech synthesizer for supplying synthesized speech prompts to said user.

* * * * *